United States Patent
Shepard et al.

(10) Patent No.: US 10,356,228 B2
(45) Date of Patent: Jul. 16, 2019

(54) SYSTEMS, METHODS, AND APPARATUS FOR CONTROLLING POWER SEMICONDUCTOR DEVICES

(71) Applicant: General Electric Company, Schenectady, NY (US)

(72) Inventors: Mark E. Shepard, Salem, VA (US); Todd David Greenleaf, Salem, VA (US); Alan Carroll Lovell, Salem, VA (US)

(73) Assignee: General Electric Company, Schenectady, NY (US)

( * ) Notice: Subject to any disclaimer, the term of this patent is extended or adjusted under 35 U.S.C. 154(b) by 481 days.

(21) Appl. No.: 14/935,670

(22) Filed: Nov. 9, 2015

(65) Prior Publication Data

US 2016/0065701 A1    Mar. 3, 2016

Related U.S. Application Data

(63) Continuation-in-part of application No. 13/648,816, filed on Oct. 10, 2012, now Pat. No. 9,184,650.

(51) Int. Cl.
| | |
|---|---|
| *G06F 1/26* | (2006.01) |
| *H04L 29/06* | (2006.01) |
| *H04L 29/08* | (2006.01) |
| *H04L 27/148* | (2006.01) |
| *G06F 1/3287* | (2019.01) |
| *H02M 1/08* | (2006.01) |
| *H02M 1/00* | (2006.01) |

(52) U.S. Cl.
CPC ............ *H04L 69/26* (2013.01); *G06F 1/3287* (2013.01); *H02M 1/08* (2013.01); *H04L 27/148* (2013.01); *H04L 69/323* (2013.01); *H02M 2001/0012* (2013.01)

(58) Field of Classification Search
None
See application file for complete search history.

(56) References Cited

U.S. PATENT DOCUMENTS

| | | | | |
|---|---|---|---|---|
| 5,877,882 | A | * | 3/1999 | Green ................ H04B 10/1143 398/107 |
| 2002/0181571 | A1 | * | 12/2002 | Yamano ................. H04L 12/10 375/222 |
| 2006/0050666 | A1 | | 3/2006 | Odenwalder |

(Continued)

FOREIGN PATENT DOCUMENTS

| | | |
|---|---|---|
| JP | S60150271 A | 8/1985 |
| JP | H06245505 A | 9/1994 |

(Continued)

OTHER PUBLICATIONS

First Japanese Office Action from Japanese Application No. 2003-209762, translated Mar. 2, 2019 (3 pages).

(Continued)

*Primary Examiner* — Paul B Yanchus, III
(74) *Attorney, Agent, or Firm* — Armstrong Teasdale LLP (57) ABSTRACT

Systems, methods, and apparatus for controlling power semiconductor devices are described. According to one embodiment of the disclosure, there is disclosed a system. The system may include a serial communication link between a controller and a power electronics module, where a continuous bit stream passes through the serial communications link.

28 Claims, 6 Drawing Sheets

(56) References Cited

U.S. PATENT DOCUMENTS

| | | |
|---|---|---|
| 2006/0242350 A1 | 10/2006 | Worley |
| 2008/0198904 A1 | 8/2008 | Chang |
| 2009/0092398 A1* | 4/2009 | Graber .................. H04B 10/801 398/116 |
| 2009/0168810 A1 | 7/2009 | Chengson et al. |
| 2012/0076146 A1* | 3/2012 | Rohatschek .......... H04L 12/422 370/392 |

FOREIGN PATENT DOCUMENTS

| | | |
|---|---|---|
| JP | H09229972 A | 9/1997 |
| JP | H11178349 A | 7/1999 |
| JP | 2000341233 A | 12/2000 |
| JP | 2000354023 A | 12/2000 |

OTHER PUBLICATIONS

Second Japanese Office Action from Japanese Application No. 2013-209762, translated Mar. 2, 2019 (2 pages).

Japanese Search Report from Japanese Application No. 2013-209762, translated Mar. 2, 2019 (19 pages).

\* cited by examiner

SYSTEMS, METHODS, AND APPARATUS FOR CONTROLLING POWER SEMICONDUCTOR DEVICES

CROSS REFERENCE TO RELATED APPLICATION

This application is a continuation in part application that claims priority to and benefit of U.S. patent application Ser. No. 13/648,816, filed Oct. 10, 2012, published as U.S. P-G Publication 2014/0097886 (Apr. 10, 2014), which will issue as U.S. Pat. No. 9,184,650 on Nov. 10, 2015 and is fully incorporated by reference herein, and made a part hereof.

TECHNICAL FIELD

Embodiments of the disclosure relate generally to power control, and more specifically to systems, methods, and apparatus for controlling power semiconductor devices.

BACKGROUND

Control systems are utilized in a wide variety of different applications. For example, control systems are utilized in conjunction with one or more power generating devices in power plants and/or in process plants. Control systems typically include a controller in communication with one or more components of the control system via one or more communications channels. However, conventional control systems are not designed to handle voluminous amounts of data communications. As such, only limited data may be communicated and/or processed.

Further, continuous "analog" signals in power converters are sensed for regulation, slow protection (e.g., thermal), and fast protection (e.g., desaturation, overcurrent) uses. Typical signals include phase currents, phase-neutral or phase-phase voltage, DC link voltage, di/dt reactor voltage or current, temperature, etc. Historically, analog signals have been routed to control electronics using copper wires, either at native signal levels or after passive attenuation. Voltage disturbances and "noise" have always been problematic in certain settings (e.g., power production environments) because remote analog electronics exist in a different common mode (CM) voltage environment from the quantities being measured. This is particularly an issue where low-latency level comparisons must be made for instantaneous protection because common-mode rejection ratio (CMRR) deteriorates at higher frequencies and instantaneous protection is typically required around the switching events that produce high CM transitions. There are no convenient means for galvanic isolation of continuous analog signals across bridge potentials (Viorm>1 kV). As voltage and power levels increase, the physical size of converters, separation between bridge and electronics, and common mode levels also increase, further exacerbating the issue. Instrumentation of bridge feedbacks at sample rates higher than the frame rate of the bridge control continues to be very helpful for development and root-cause analysis (RCA). One bit oversampled Delta-Sigma Modulators (DSM's) have typically been used to convert analog bridge signals into the digital domain. The single bit stream can be conveniently transmitted across a voltage isolation boundary using an optocoupler. Legacy products have used VCO's that behave much like first-order DSM's and have processed signals using "VCO counters" which are sinc^1 filters. Later products have evolved to using higher sample rate second-order DSM's and are moving toward higher order sinc decimation filters. Medium voltage converters are exceeding the Viorm capabilities of optocouplers to send signals between bridge potentials and earth ground.

Therefore, systems and methods are desired that overcome challenges in the art, some of which are described above.

SUMMARY

What is desired is a solution that provides the following features to address the above issues: sampling and A/D conversion of analog signals as close as possible to their common mode environment; full duplex transmission of both command and feedback signals with latency sufficient for bridge control; multiplexing of many sampled signals across a single isolation device for reasons of both cost and simplicity of interconnections (fewer opportunities for defects); takes advantage of increasing bandwidth of isolation devices and decreasing cost/gate of PLD components; ability to use fiber optics to communicate between common mode domains and to interrupt propagation of bridge faults that result in plasma events or breaching of isolation barriers by providing both physical and galvanic separation; combined bandwidth & latency adequate to implement instantaneous protection using sampled signals; high robustness and error tolerance; low cost; ability to reuse validated "components" in different applications with a high degree of flexibility and reliability; and low exposure to obsolescence issues Some or all of the above needs and/or problems may be addressed by certain embodiments of the disclosure. Embodiments of the disclosure may include systems, methods, and apparatus for controlling one or more power semiconductor devices.

According to one embodiment of the disclosure, there is disclosed a system. The system may include at least one power source for selectively providing power to one or more power semiconductor devices controlled by a gate driver. The gate driver may include at least one controller coupled to at least one power semiconductor device interface via a first channel and a second channel configured to provide galvanic isolation of information communicated between the controller and the at least one power semiconductor device interface.

According to another embodiment of the disclosure, there is disclosed an apparatus. The apparatus may include a controller coupled to at least one power semiconductor device interface via a first channel and a second channel. The first and the second channel may include a multiplexor, a demultiplexor, an encoder, and/or a decoder configured to provide galvanic isolation of information communicated between the controller and at least one power semiconductor device interface.

According to yet another embodiment of the disclosure, there is disclosed a method. The method may include providing at least one controller, which can include a first channel and a second channel. The method may further include providing galvanic isolation of one or more signals traversing on at least one of the first channel or the second channel. Additionally, the method may include transmitting information from the at least one controller to at least one power semiconductor device interface via at least one of the first channel or the second channel.

According to another embodiment, a system for controlling one or more power semiconductor devices is disclosed. The system comprises a serial communication link between a controller and a power electronics module, wherein the communications link is configured to pass a continuous bit stream at a constant frequency, wherein framing information is recovered from the continuous bit stream to define sets of bits (frames) where individual bits can be identified at each end of the serial communication link, wherein quantities to be communicated from a sending end to a receiving end of the serial communication link can be either discrete binary values or samples of continuous variables; one or more samplers for continuous variables, wherein the one or more samplers have a set sample bit width and a sample rate synchronous to a frame rate of the serial communication link; and logic at each end of the serial communication link to multiplex and demultiplex the quantities into and out of frames. In one aspect, the system may further comprise one or more filters, wherein the one or more filters convert the samples of continuous variables to lower sample rate, higher precision samples, which can provide either low-latency coarse measurements for protection functions or slower, high-precision samples for control According to yet another embodiment, a method for controlling one or more power semiconductor devices is disclosed. The method comprises passing a continuous bit stream at a constant frequency over a serial communication link between a controller and a power electronics module; recovering framing information from the continuous bit stream to define sets of bits (frames), where individual bits can be identified at each end of the serial communication link, wherein quantities to be communicated from a sending end to a receiving end of the serial communication link can be either discrete binary values or samples of continuous variables; sampling the continuous variables using one or more samplers, wherein the one or more samplers have a set sample bit width and a sample rate synchronous to a frame rate of the serial communication link; and multiplexing and demultiplexing the quantities into and out of frames. In one aspect the method may further comprise filtering the samples of continuous variables using one or more filters, wherein the one or more filters convert the samples of continuous variables to lower sample rate, higher precision samples, which can provide either low-latency coarse measurements for protection functions or slower, high-precision samples for control.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium.

More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
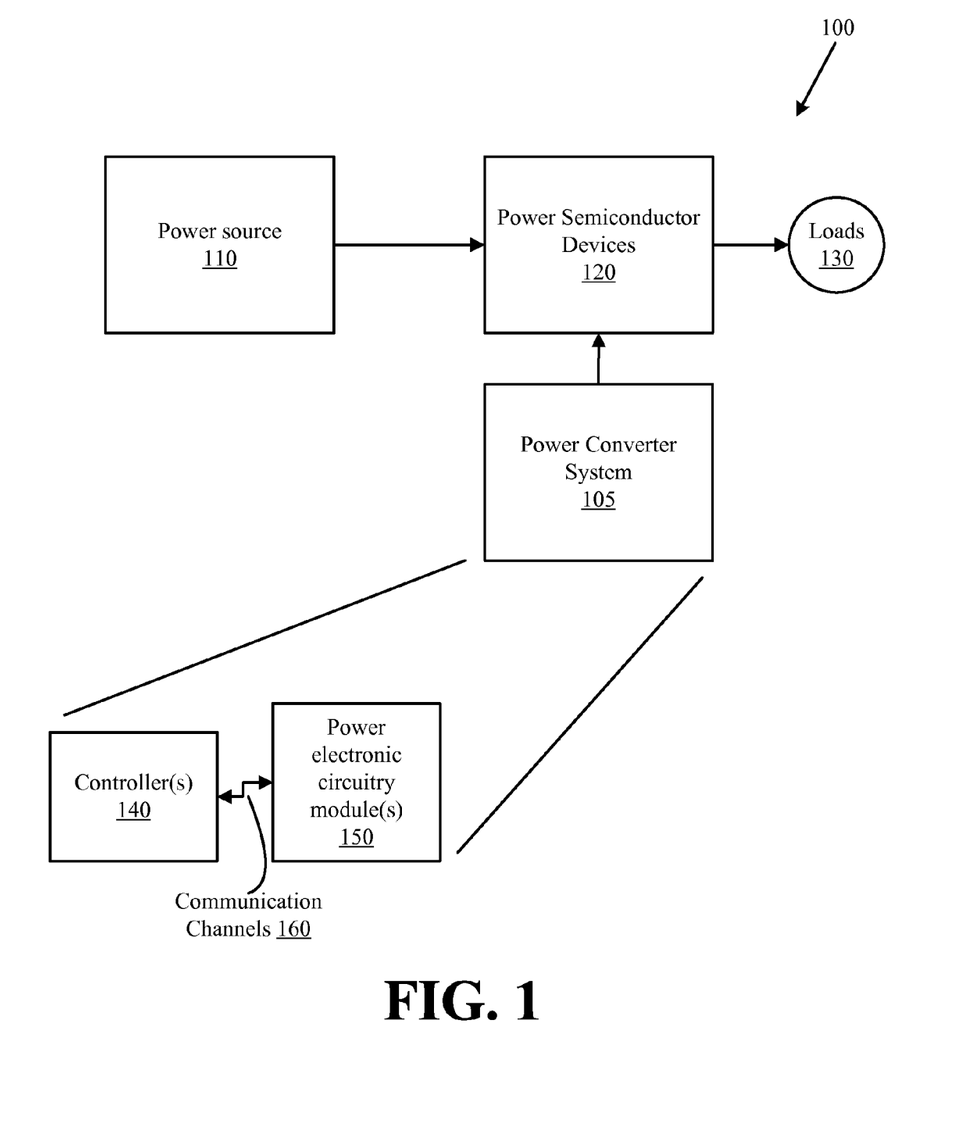
FIG. 1 is a diagram of an example control system according to with various embodiments of the disclosure.

As briefly discussed above, control systems may be used to control one or more components of a power system, such as, for instance, one or more power semiconductor devices (referred to as "devices") of a power converter system. For instance, FIG. 1 is a schematic representation of a system 100 that includes a power converter system 105 and a power source 110, such as, a generator. The power converter system 105 may include one or more devices 120 that may be used to convert the received power from power source 110 to a desired output voltage and frequency to various loads 130, such as, for instance, motors, power grids and/or resistive loads, etc. As shown in FIG. 1, the power converter system 105 may include a controller 140 to control one or more devices 120 in communication with one or more power electronic circuitry modules 150 via a respective interface and one or more channels.

Figure 2:
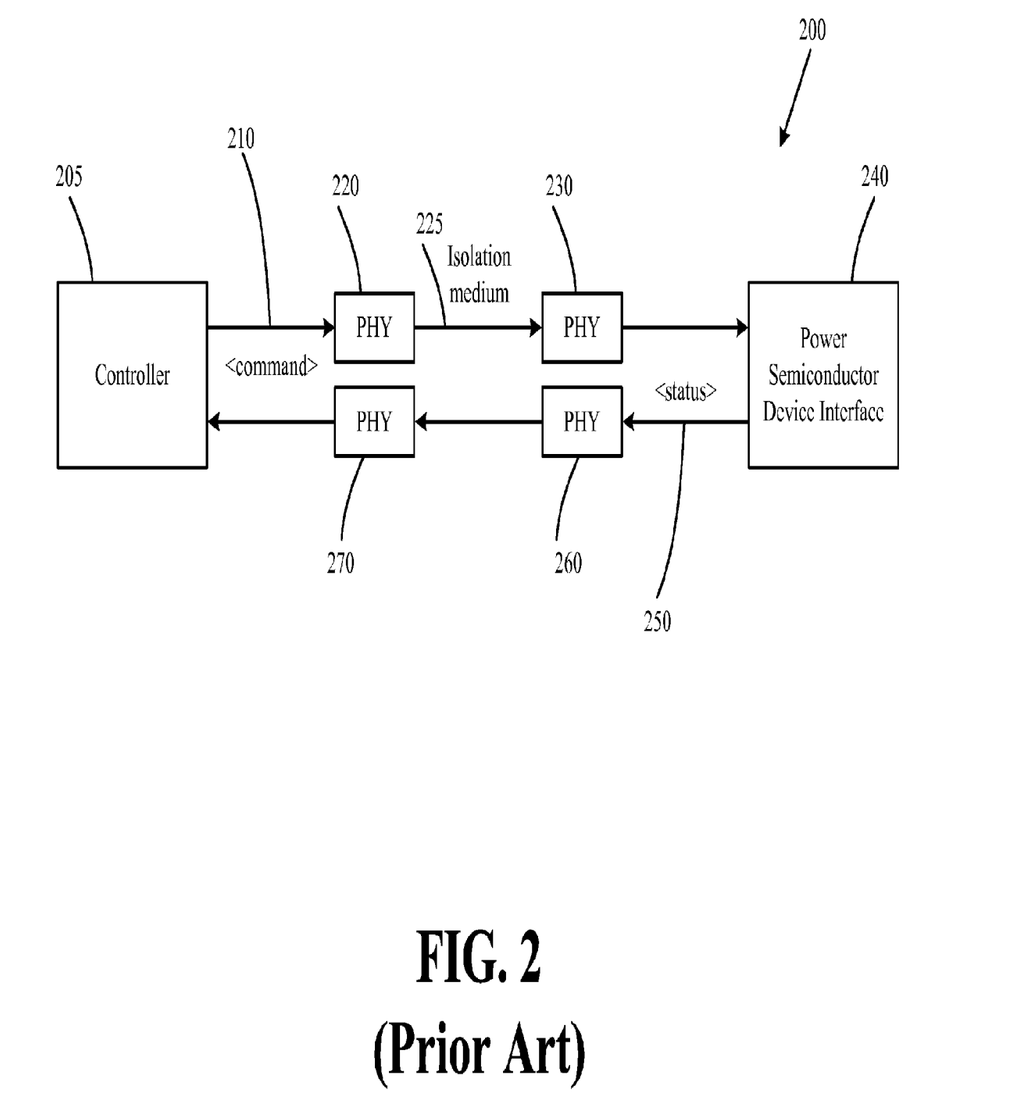
FIG. 2 is a block diagram of conventional communications in a control system according to the prior art.

For instance, shown in FIG. 2, is an example block diagram illustrating data communications conventionally employed between components of a control system 200 that may include, for example, a controller 205 coupled to a respective interface 240 via a command channel 210 and status channel 250. In operation, one or more command signals may be communicated from the controller 205 to the power semiconductor device interface 240 via the command channel 210, where at block 220, the command signal may be converted and carried by to an optical signal that propagates through an isolation medium 225, such as an optical isolation fiber, by an electro-optical device, such as a semiconductor light amplification by stimulated emission of radiation (laser) device. Next, at block 230, another device 230, such as a photodetector, may receive and recover the command signal, or otherwise convert the isolated optical signal to a corresponding electrical signal for communication to the power semiconductor device interface 240. Likewise, one or more status signals may be communicated by the power semiconductor device interface 240 to the controller 205 via the status channel 250. In some embodiments, the status signal may be generated based on various measurement data collected by, for instance, a plurality of sensors configured to monitor and communicate operational data associated with the devices 120 to the interface 240 via one or more suitable network connections. Thereafter, one or more additional transceiver devices 260 may be configured to receive then convert the received status signal to an optical signal that propagates through the isolation fiber, and another receiver device 270 may receive and recover the status signal for communication to the controller 205.

With continued reference to FIG. 2, redundant circuitry associated with various devices, particularly, devices 220, 260, and the devices 230, 270, may be employed in such systems, which may add to cost and complexity of the system and result in relatively limited bandwidth for communicating via channels 210, 250, respectively. As such, the command signal and the status signal may, in some cases, be limited to single binary signals. Therefore, conventional systems may not be configured to carrying an enhanced, or otherwise rich data set, including operating data associated with individual power semiconductors of the power system.

The systems, methods, and apparatus of the disclosure herein may provide relatively higher bandwidth communications architecture employing any variety of communicative links, including serial links. Such relatively high bandwidth communicative links may be used for communicating relatively enhanced data providing insight into the operation of the one or more power semiconductor devices, such as power semiconductor devices between one or more processing components. The enhanced data may include a variety of information, such as, for example, a rate of change of voltage or current, a magnetic field intensity, non-physical information as well such as stored digital information and/or asset information. Additionally the enhanced data may include other semiconductor specific information, such as, junction temperature or saturation voltage, and/or asset management information, such as, device serial numbers, hardware revisions or software revisions and potentially other information, that may be processed as will be described.

A serial link may be employed to facilitate communication of enhanced data, such as data pertaining to power semiconductor devices, transferred across each end of the communicative link between a power semiconductor device interface and a controller. In certain embodiments, processing components of a control system may be configured to convert parallel communications to serial communications via the serial link without substantially increasing the complexity of typical computer architectures employed in conventional computer control systems. As described in more detail below, the serial link may be used to facilitate communication of enhanced data between a controller and a power semiconductor device interface ("interface") with a relatively rich dataset that may provide for enhanced control of the power semiconductor devices of the system. For the purposes of this application, power semiconductor devices may include any suitable devices that configured to provide switching functionality for the purposes of directing or controlling the flow of power or for the purposes of providing power to any suitable power load. Power semiconductor devices may include, but are not limited to, insulated gate bipolar transistors (IGBT), metal-oxide-semiconductor field effect transistors (MOSFET), bipolar junction transistors (BJT), heterojunction bipolar transistors (HBT), high electron mobility transistors (HEMT), any suitable junction or field effect transistors, or combinations thereof.

In one example embodiment, the interface may be configured to receive monitoring data associated with one or more devices that provides insight into the operations of the devices by, for instance, one or more sensor devices, via a suitable network communication. Thereafter, the interface may communicate a first set of monitoring data via a first channel and a second set of monitoring data via a second channel to one or more devices configured to receive and multiplex the first and second set of monitoring data. The multiplexed data sets may then be communicated to a serial link communicates the parallel sets of data to the controller. The controller may be configured to receive and process the data in order to identify any potentially damaging events. Based at least in part upon these determinations, the controller may provide one or more control signals that control the operation of one or more power semiconductor devices via the first and second channels, where the serial link may be employed in the same fashion to communicate such data to the interface in a predictable and synchronous fashion, where it may be used for analysis, processing, and/or other purposes.

In another embodiment, the serial link may include one or more devices that process combined data communicated on the first and second channels. The devices may be configured to receive the multiplexed data and provide modulation, clock recovery, adaptive equalization, link establishment and monitoring functions to fully implement the communications link between a controller and respective interface of a control system. In one embodiment, a control interface, such as an application specific integrated circuit (ASIC) or a microcontroller, may control one or more devices associated with the multiplexing of data communicated via the first and second channels, as well as potentially other devices associated with various operations of the serial link.

In yet another embodiment, one or more software programs and/or modules may be used by the control interface to implement the functions described herein. The technical effects of certain embodiments herein may include, but are not limited to, reduced cost and complexity associated with communicating data over one or more communicative channels. In this regard, redundant circuitry may be reduced, as the one or more devices may be used in association with signals communicated across both the first and second channels.

Figure 3:
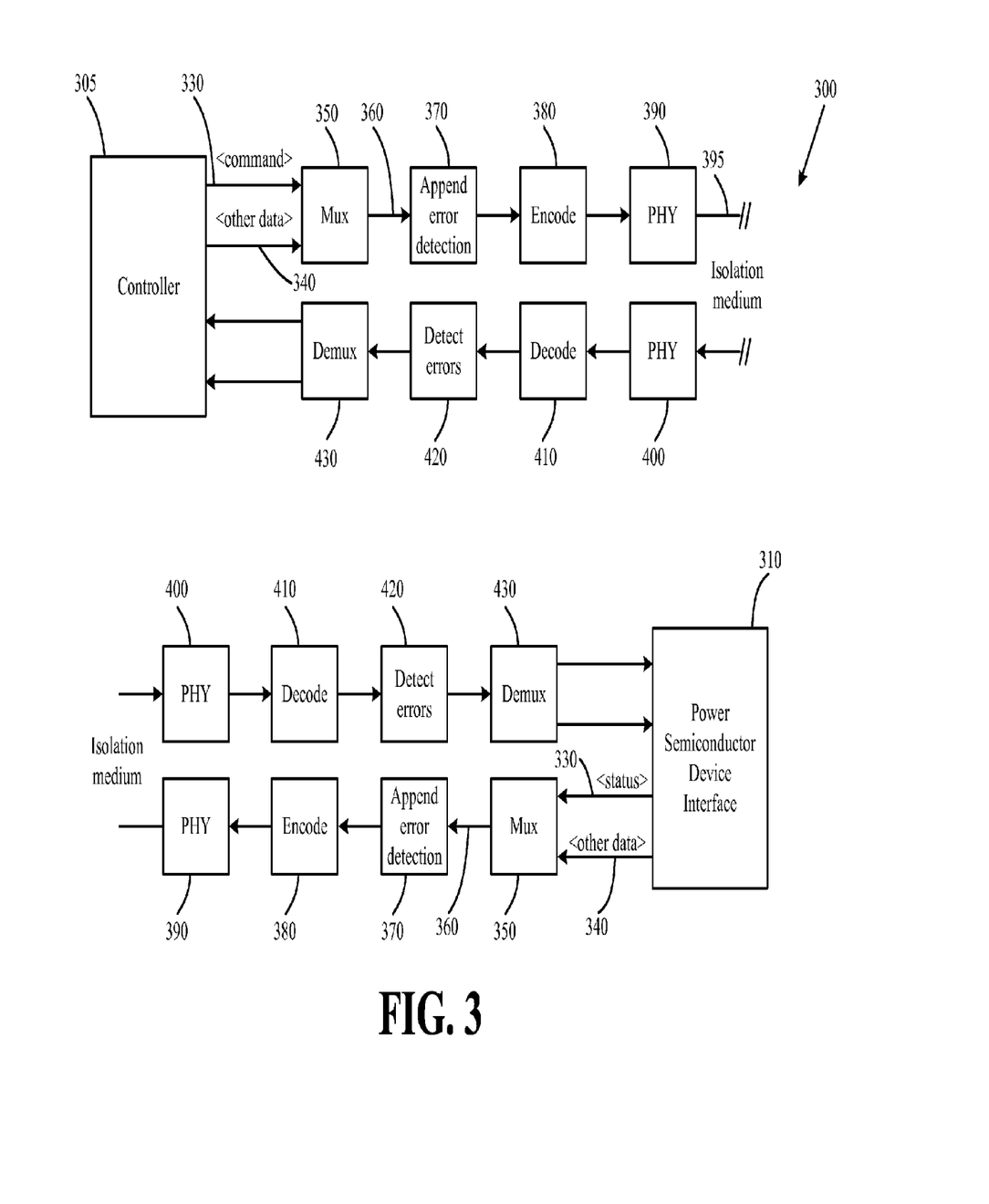
FIG. 3 is a block diagram of an enhanced communication control system according to an embodiment of the disclosure.

Referring now to FIG. 3, a block diagram of an example computer architecture associated with data communications of a system 300 using a serial link in accordance with the present disclosure, which may include a controller 305 and a power semiconductor device interface 310 is shown.

The controller 305 may be configured to output a first signal and a second signal, each signal having one or more data bits via a command channel 330 and a status channel 340, respectively. Thereafter at block 350, data bits of each signal may be combined by, for instance, a multiplexing device configured to receive channels 330, 340 and interleave the data from the channels 330, 340 into a single serial data stream. In various embodiments, multiplexing may be performed relative to a bit clock recovered by and/or from the controller 305 to provide a synchronous clock signal for sampling and/or multiplexing. In operation, one or more data bits of the first and the second signals may be multiplexed, such as into a packet, which may then be transmitted via a serial link 360. Multiplexing and demultiplexing may be implemented using, for example, a state machine in FPGA logic. At each end of the serial communication link, the data is multiplexed into and demultiplexed out of frames. The serial communication link 360 between the controller 305 and the power semiconductor device 310 is configured to pass a continuous bit stream at a constant frequency. In some embodiments, the communication link is full duplex. The serial communication link may be, for example, a 100 Mbit Ethernet physical layer. In some embodiments, the Ethernet physical layer comprises 100BASE-TX copper or 100BASE-FX fiber optic cable. The physical layer may be galvanically isolated using, for example, opto-couplers, sections of fiber optic cable and/or on-card isolators or other means. Quantities to be communicated from a sending end to a receiving end of the serial communication link can be either discrete binary values or samples of continuous variables. For example, there may be at least three basic classes or types of data or signals passed among the control hardware: (a) high speed, low latency signals used for control and protection. Most signals fall in this category. Time criticality may be measured in, for example, tenths of microseconds. (b) 2. Once-per-frame quantities. Time criticality may be measured in, for example, tens of microseconds. And, (c) high latency, low-speed data. This data utilizes a small amount of bandwidth, but still represents a large volume of information. Time criticality measured in frames. Continuous variables may be present at a rate of 1 per frame, multiple samples in a frame, or less than once per frame. In some embodiments, one bit in each frame is used to construct a lower sample rate data stream communicating large frames of slow data. For example, slow data may comprise temperature or power supply voltages.

Depending on a direction of communications on the communication link, the quantities to be communicated from the sending end to the receiving end of the serial communication link can be feedback (measured) variables or commanded variables. The feedback (measured) variables or commanded variables can comprise, for example, one or more of phase voltages, phase currents, DC link voltages, switch desaturation, error states; power switch state command, or enable/disable commands.

At error checking block 370, the serial link 360 may be configured to add error checking and/or transmission quality checking overhead, such as parity bit(s) and/or cyclic redundancy checks (CRC) to the data packet for the purposes or transmission error detection. In some embodiments, processing at error checking block 370 is performed by one or more electronic devices including one or more processors configured to receive data communicated via the serial link 360 and determine and process the data to append error checking bit(s) and/or information. The processing at error checking block 370 may further include determining requirements for latency, coherency, periodicity, and error detection for the data communicated. For instance, the data communicated via channel 330 may be configured to tolerate an occasion bit error, and thus only minimal error detection is needed, but the data communicated via channel 340 may be configured such that not even a single bit error may occur, and therefore stronger and/or more precise error detection is needed. Processing at error checking block 370 may further include comparing each of the signals, such as those carried by channels 330, 340, in order to identify an error detection method that may be employed. De-bouncing may also be employed for error detection and correction. For example, de-bouncing of the discrete binary values provides robustness to occasional bit errors by requiring two or more consecutive state changes before declaring such, while still providing a low latency due to an overall high frame rate. De-bouncing comprises monitoring a binary discrete variable—if it changes state, then continue monitoring for a defined period of time make sure it stays in the changed state before it is declared changed. If it changes back on the next sample, it was probably noise and can be ignored. The defined period of time can be however long desired, based on the nature of the variable and valuation of latency vs noise immunity. De-bouncing provides robustness to occasional bit errors as de-bouncing or averaging reduces the effect of bit errors so they can be tolerated without disturbing the process. Even with de-bouncing, the disclosed embodiments provide low latency due to an overall high frame rate. For example, a 6.25 MHz Fast Ethernet frame comprises four 4-bit nibbles (16 bits) at 25 MHz. With simple framing utilizing one bit in each nibble to indicate the first nibble in a frame, that leaves 12 bits for actual data, so 12 1-bit variables or samples can be sent in each frame at 6.25 MHz. If a higher sample rate is needed for one or more variables, then two bits in a frame can be used to send two samples per frame—for example in the first and third nibbles for constant 12.5 MHz sample rate.

The error detection appended signal from error checking block 370 may next be received by encoder 380, where various methods may be employed for encoding the data communicated on the link 360 into a suitable format, modulation, and/or code. The data is encoded according to a selected encoding protocol and is prepared for communication to a corresponding data communications component. The encoder may code and/or modulate the received data signal as the constituent bits of the data signal are received or as blocks and/or data packets of the received bits. For example, encoding may comprise one or more samplers for continuous variables, wherein the one or more samplers have a set sample width such as 1 bit, 2 bits, 4 bits, etc., and a sample rate synchronous to a frame rate of the serial communication link. For example, the one or more samplers for continuous variables comprise oversampled delta sigma modulators. Generally, the one or more samplers for continuous variables have a rational frequency relationship such as 1/1, 1/2, 1/3, 2/1, or 2/3 where 1/1=5 MHz/5 MHz; 1/2=2.5 MHz/5 MHz; etc.

Encoding may further comprise one or more filters, wherein the one or more filters convert the samples of continuous variables to lower sample rate, higher precision samples, which can provide either low-latency coarse measurements for protection functions or slower, high-precision samples for control. Generally, the one or more filters comprise a sinc filter of order 1-3 followed by a digital infinite impulse response (IIR) or a finite impulse response (FIR) lowpass filter. Generally, low-latency coarse measurements can be thought of as protection functions that require detection times in the 1-10 microsecond range. For a 6.25 MHz basic sample rate, an 8× ratio decimation filter yields a decimated sample rate of 780 kHz (1.28 μs sample period) with an effective number of bits (ENOB) of about 6, for resolution of 64 detection levels. Generally, lower sample rate, higher precision samples comprise control functions that require high measurement precision. While high measurement precision is desired, regulator loops typically run at 2× the PWM frequency, for example a 5 kHz loop (20 us period) for 2.5 kHz modulation. A filter having a decimation ratio of 256× provides ENOB of 18.9 at a sample rate of 24.4 kHz. This is faster than required for the control loop and provides measurement resolution better than $2^{-18}$ ~0.0004%.

The filtering and averaging process provides robustness to occasional bit errors as they are all of least significant bit (LSB) weighting or of equal weighting. If each sample is only one bit wide, then any bit error on any sample has the same significance as on any other sample. But when transmitting an 18-bit sample of a variable, the most significant bit (MSB) has $2^{17}$ times more weight than the LSB. A bit error in the LSB is insignificant, a bit error in the MSB is a 2× change in sample value. This is why some sort of error detection and/or correction is required for low sample rate multi-bit binary values—there are bits with high significance where an error cannot be tolerated. As disclosed herein, there is enough "effective redundancy" because of the high sample rate and decimation operation to yield an implementation that is robust to occasional bit errors. The high sample rate is cheap and it is a bonus because it is inherently low latency in addition to being robust.

The encoded data provided by the encoder 380 may be processed at physical (PHY) block 390, where the encoded data is received by a device, such as a transceiver that may communicate the encoded data into an isolation channel via an isolation medium 395. In some embodiments, the PHY block 390 may comprise at least one media independent interface (MII) PHY device such as, for example, an IEEE 802.3 compliant PHY device.

In some embodiments, at least one media independent interface (MII) PHY device may be used in recovering framing information from the continuous bit stream to define sets of bits (frames) where individual bits can be identified at each end of the serial communication link. In some embodiments, recovering framing information from the continuous bit stream to define sets of bits (frames) comprises the MII PHY initially framing the continuous bit stream into multi-bit nibbles such as, for example, 4-bit nibbles. In one aspect, the PHY block may include an electrical to optical converter in the case of optical galvanic isolation. In this case, the electrical to optical converter may be a laser, a light emitting diode (LED), or the like. The isolation medium 395, in this case may be optical fiber, such as multimode fiber, or any other suitable waveguide. In certain other embodiments, galvanic isolation may be implemented with sonic devices or electrical devices.

A PHY block 400 may receive the one or more output of the isolation channel and recover the encoded data therefrom, such as by converting an optical signal to an electrical signal. Such a process may involve coupling the optical isolation signal to a photodetector to generate an electrical signal corresponding to the isolation optical signal. In certain cases, filters and edge sharpening processes may be implemented to improve the fidelity of the signal transmitted via the galvanic isolation channel.

The system may further include a decoder 410 that may receive the output signal of the PHY block 400 and decode the output signal. In one aspect, the decoder 410 may reverse the encoding performed by the encoder 380. At this point, the decoded signal output by the decoder 410 may be provided to the error detector 420 that may detect errors based at least in part on the error detection overhead provided by the error checking block 370. The error checking may be associated with transmission based errors and may entail parity checks and/or CRC checks. In one aspect, the error detector may remove the error checking overhead as appended by the error check block 370 from the received signals and provide the error check free signal to a demultiplexer 430 that may recover the original channel 330 and 340 signals and provide the same to the power semiconductor device interface 310.

The power semiconductor device interface 310 may also be configured to communicate information and/or data to the controller 305 via status channel 440 and other data channel 450. The elements and processes used to communicate from the power semiconductor device interface 310 to the controller 305 may be substantially similar to the communications from the controller 305 to the power semiconductor device interface 310. In the interest of brevity, the multiplexing, error detection, galvanic isolation, and demultiplexing processes and associated hardware and/or software for communicating from the power semiconductor device interface 310 to the controller 305 will not be repeated here.

Figure 4:
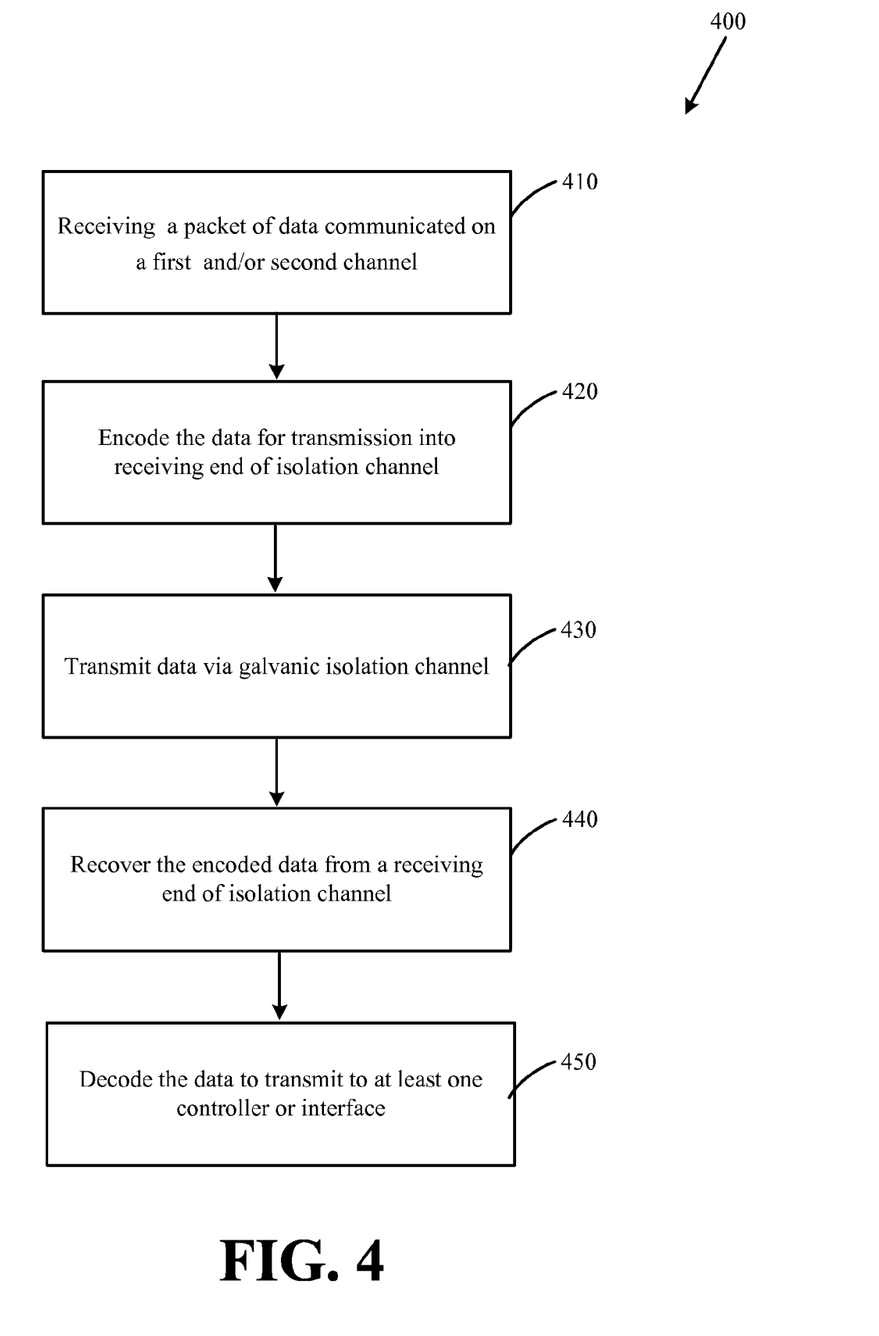
FIG. 4 is a flow chart of one example method for controlling one or more power semiconductor devices according to an embodiment of the disclosure.

Referring now to FIG. 4 is an exemplary flow diagram illustrating an example method 400 for controlling one or more power semiconductor devices according to embodiments of the disclosure. The method 400 may begin at block 410, where one or more packets are received on a first and/or second channel. In certain embodiments, each of the first and second channels may carry different types of data. At block 420, the data received on the first and second channels may be encoded. In one aspect the data may also be multiplexed, such as time multiplexed, to combine the data streams of the first and the second channels. Next, at block 430, the data may be transmitted via a galvanically isolated channel. The process of this transmission may entail converting the encoded signal to one of an optical signal, audio signal, and/or a different electrical signal. In the case of optical galvanic isolation, the encoded signal may modulate a laser diode and the optical output of the laser diode may be transmitted via an optical cable coupled to the laser diode. Thereafter, at block 440, the encoded signal may be retrieved from the galvanic isolation channel. In certain cases, a conversion from an optical signal on the isolation channel to a corresponding electrical signal may be performed. Such an operation may entail the use of a photodetector in the case of optical galvanic isolation. At block 450, the encoded signal may be decoded and provided to one of a controller or a power semiconductor device interface.

In one example, a computing device can perform any, some, or all of the operations of FIG. 4. The processes of FIG. 4 are illustrated as logical flow diagrams, in which each operation represents a sequence of operations that can be implemented in hardware, software, or a combination thereof. In the context of software, the operations can represent computer-executable instructions stored on one or more computer-readable storage media that, when executed by one or more processors, perform the recited operations. Generally, computer-executable instructions can include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
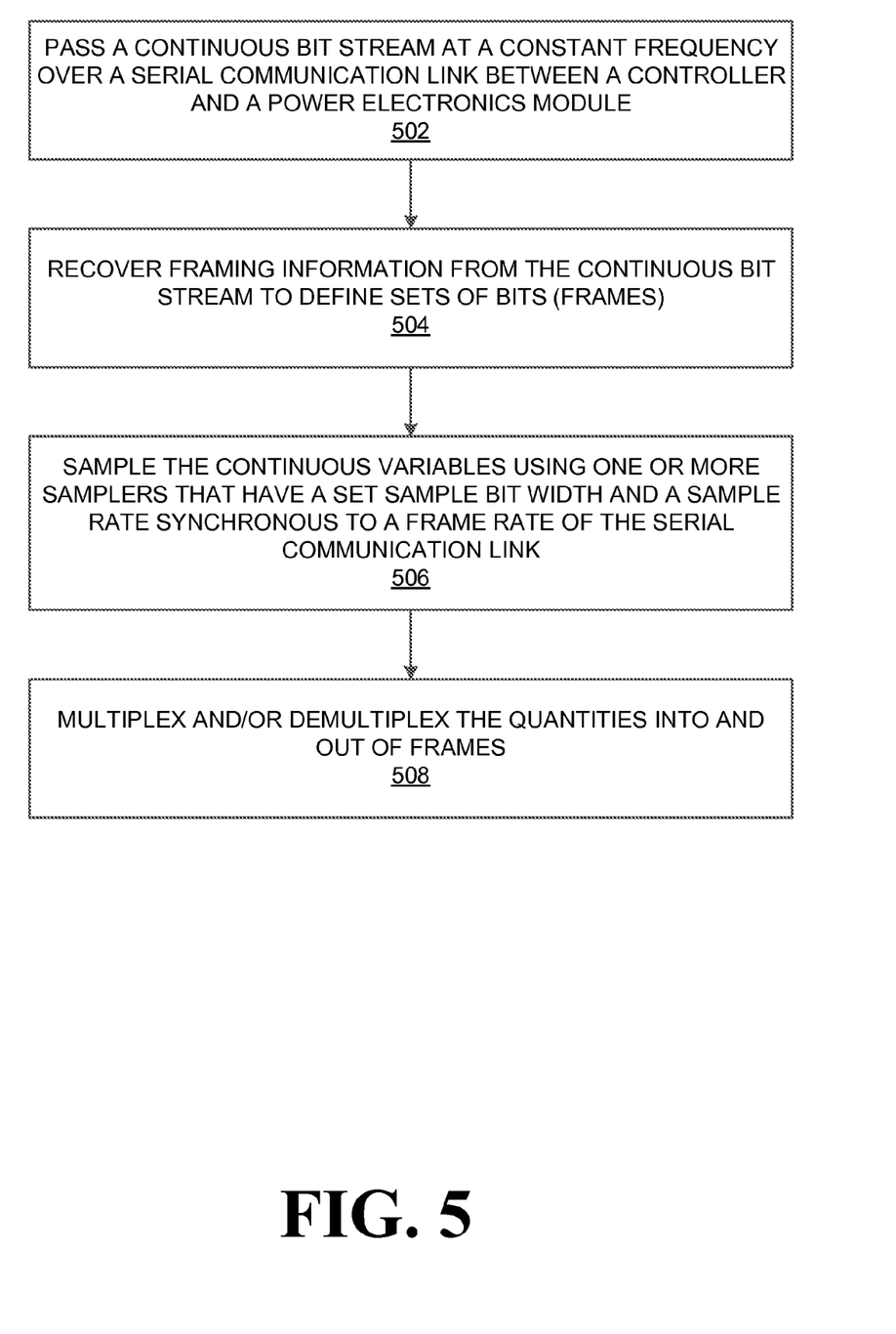
FIG. 5 is a flow chart of another example method for controlling one or more power semiconductor devices according to an embodiment of the disclosure.

FIG. 5 is a flow chart of another example method for controlling one or more power semiconductor devices according to an embodiment of the disclosure. At 502, a continuous bit stream at a constant frequency is passed over a serial communication link between a controller and a power electronics module. Generally, the communication link is full duplex. In various aspects, the communication link can be a 100 Mbit Ethernet physical layer, the Ethernet physical layer may comprise 100BASE-TX copper or 100BASE-FX fiber, and/or the Ethernet physical layer may be galvanically isolated.

At 504, framing information is recovered from the continuous bit stream to define sets of bits (frames), where individual bits can be identified at each end of the serial communication link. Quantities to be communicated from a sending end to a receiving end of the serial communication link can be either discrete binary values or samples of continuous variables. Depending upon the direction of communications on the communication link, the quantities to be communicated from the sending end to the receiving end of the serial communication link can be feedback (measured) variables or commanded variables. For example, the feedback (measured) variables or commanded variables comprise one or more of phase voltages, phase currents, DC link voltages, switch desaturation, error states; power switch state command, or enable/disable commands. In one aspect, at least one media independent interface (MII) PHY device may be used in recovering the framing information from the continuous bit stream to define sets of bits (frames). The at least one media independent interface (MII) PHY device may comprise an IEEE 802.3 compliant PHY device. In one aspect, recovering framing information from the continuous bit stream to define sets of bits (frames) may comprise the MII PHY initially framing the continuous bit stream into multi-bit nibbles such as, for example, 4-bit nibbles. In one aspect, the discrete binary values may be de-bounced. De-bouncing of the discrete binary values provides robustness to occasional bit errors by requiring two or more consecutive state changes before declaring such, while still providing a low latency due to an overall high frame rate.

At 506, the continuous variables are sampled using one or more samplers, wherein the one or more samplers have a set sample bit width and a sample rate synchronous to a frame rate of the serial communication link. For examples, the one or more samplers for continuous variables may have a set sample bit width of one bit. The one or more samplers for continuous variables may comprise oversampled delta sigma modulators. The one or more samplers for continuous variables have a rational frequency relationship. In one aspect the continuous variables may be present at a rate of one per frame, multiple samples in a frame, or less than once per frame.

At 508, the quantities are multiplexed and/or demultiplexed into and out of frames.

Though not shown in FIG. 5, in one aspect the samples of continuous variables may be filtered using one or more filters, wherein the one or more filters convert the samples of continuous variables to lower sample rate, higher precision samples, which can provide either low-latency coarse measurements for protection functions or slower, high-precision samples for control. The one or more filters can provide robustness to occasional bit errors as they are all of equal or least significant bit (LSB) weighting. In one aspect, at least one bit in each frame can be used to construct a lower sample rate data stream communicating larger frames of slower data. For example, the slow data may comprise temperature or power supply voltages.

The system has been described above as comprised of units. One skilled in the art will appreciate that this is a functional description and that the respective functions can be performed by software, hardware, or a combination of software and hardware. A unit can be software, hardware, or a combination of software and hardware.

Figure 6:
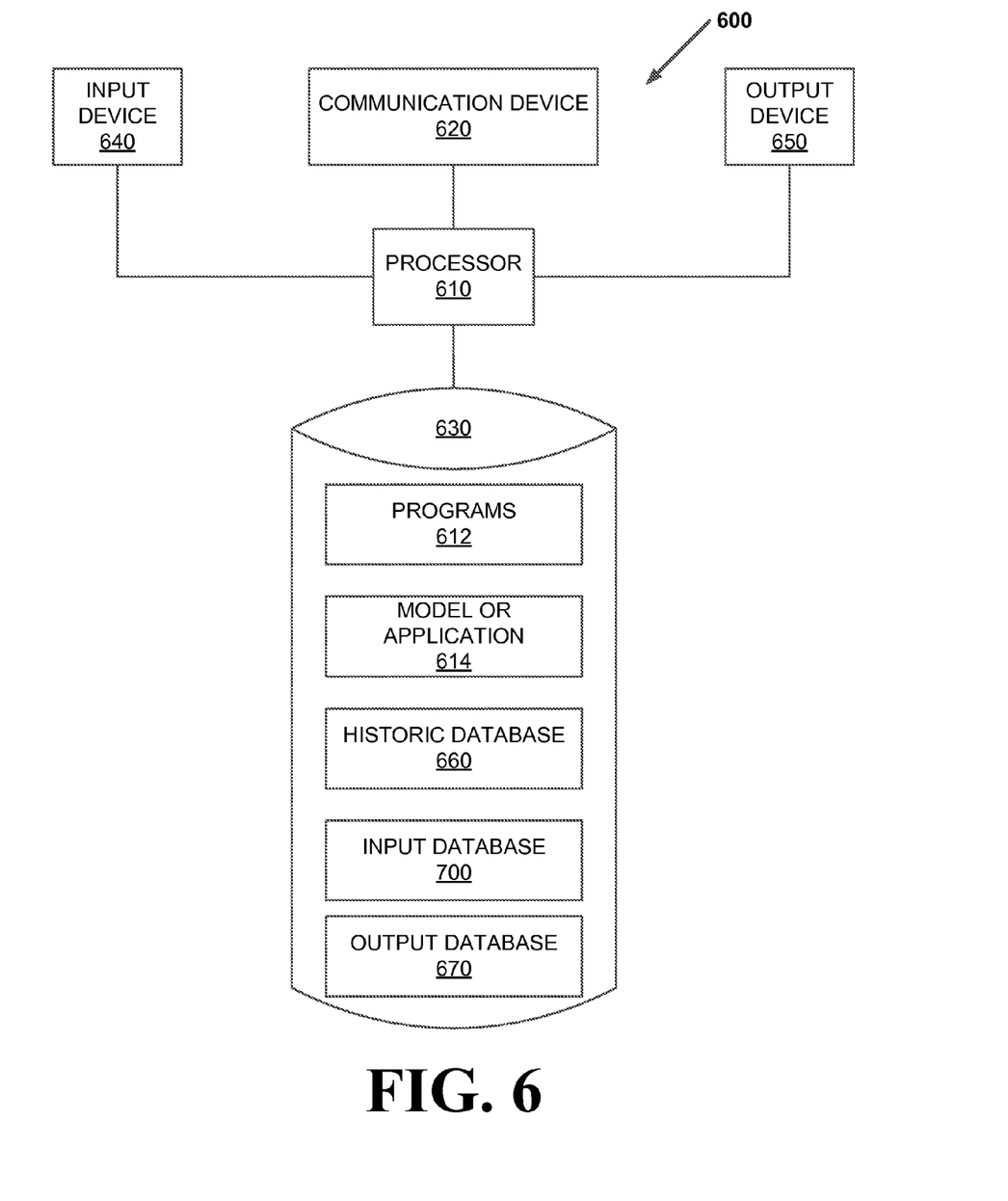
FIG. 6 is block diagram of a platform according to some embodiments of the present invention.

For example, FIG. 6 illustrates a platform 600 that may be, for example, associated with the system and method of FIGS. 1-5. The platform 600 comprises a processor 610, such as one or more commercially available Central Processing Units (CPUs) in the form of one-chip microprocessors, coupled to a communication device 620 configured to control a power electronics module over a serial link. The platform 600 may further include an input device 640 (e.g., a mouse and/or keyboard to enter information about model algorithms) and an output device 650 (e.g., to output reports regarding the power electronics module, and the like). In one aspect, the platform 600 may comprise the controller 305 as described in reference to FIG. 3.

The processor 610 also communicates with a storage device 630. The storage device 630 may comprise any appropriate information storage device, including combinations of magnetic storage devices (e.g., a hard disk drive), optical storage devices, mobile telephones, and/or semiconductor memory devices. The storage device 630 can store a program 612 and/or a model or application 614 for controlling the processor 610. The processor 610 performs instructions of the programs 612, 614, and thereby operates in accordance with any of the embodiments described herein. For example, the processor 610 may cause a bit stream to be passed continuous bit stream at a constant frequency over a serial communication link; recover framing information from the continuous bit stream to define sets of bits (frames) where individual bits can be identified at each end of the serial communication link, wherein quantities to be communicated from a sending end to a receiving end of the serial communication link can be either discrete binary values or samples of continuous variables; sample the continuous bit stream using one or more samplers for continuous variables, wherein the one or more samplers have a set sample width and a sample rate synchronous to a frame rate of the serial communication link; control logic at each end of the serial communication link to multiplex and demultiplex the quantities into and out of frames; and convert the samples of continuous variables to lower sample rate, higher precision samples, which can provide either low-latency coarse measurements for protection functions or slower, high-precision samples for control. The processor 610 may also control a de-bouncer, wherein de-bouncing of the discrete binary values provides robustness to occasional bit errors by requiring two or more consecutive state changes before declaring such, while still providing a low latency due to an overall high frame rate.

The programs 612, 614 may be stored in a compressed, uncompiled and/or encrypted format. The programs 612, 614 may furthermore include other program elements, such as an operating system, a database management system, and/or device drivers used by the processor 610 to interface with peripheral devices.

As used herein, information may be "received" by or "transmitted" to, for example: (i) the platform 600 from another device; or (ii) a software application or module within the platform 600 from another software application, module, or any other source.

In some embodiments (such as shown in FIG. 6), the storage device 630 includes a historic database 660 (e.g., associated with past operations, results, etc.), an input database 700 (e.g., indicating refining process components, configurations, settings, etc.) and an output database 670. Moreover, various databases might be split or combined in accordance with any of the embodiments described herein.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A system for controlling one or more power semiconductor devices, comprising:
  a serial communication link configured to pass a continuous bit stream at a constant frequency having a first end coupled to a first logic module, wherein the first logic module is coupled to a controller, and a second end coupled to a second logic module, wherein the second logic module is coupled to a power electronics module;
  one or more samplers, having a sample rate, coupled to a plurality of sensors and in communication with the power electronics module; and
  a processor programmed to:
    pass a continuous bit stream at a constant frequency over the serial communication link between the controller and the power electronics module;
    retrieve, from the continuous bit stream, sets of bits that define frames including framing information, wherein individual bits can be identified at each end of the serial communication link, wherein quantities of data to he communicated from a sending end to a receiving end of the serial communication link can be one of discrete binary values and samples of continuous variables;
    sample continuous variables from the plurality of sensors using one or more samplers;
    cause the one or more samplers to synchronize the sample rate with a frame rate of the serial communication link at a rational frequency relationship, wherein the frame rate is based on the framing information, wherein the one or more samplers have a set sample bit width; and cause the first logic module and the second logic module to multiplex and demultiplex the quantities of data into and out of frames.

2. The system of claim 1, further comprising a de-bouncer, wherein de-bouncing of the discrete binary values provides robustness to occasional bit errors by requiring two or more consecutive state changes before declaring such, while still providing a low latency due to an overall high frame rate.

3. The system of claim 1, wherein, depending on a direction of communications on the serial communication link, the quantities of data to be communicated from the sending end to the receiving end of the serial communication link is one of feedback variables and commanded variables.

4. The system of claim 3, wherein the one of the feedback variables and commanded variables comprise one or more of phase voltages, phase currents, DC link voltages, switch desaturation error states, power switch state command or enable/disable commands.

5. The system of claim 1, wherein the serial communication link is a 100 Mbit Ethernet physical layer.

6. The system of claim 5, wherein the Ethernet physical layer is galvanically isolated.

7. The system of claim 1, wherein at least one media independent interface (MID PITY device is used in recovering the framing information from the continuous bit stream to define sets of bits.

8. The system of claim 7, wherein recovering framing information from the continuous bit stream to define sets of bits comprises the MII PHY initially framing the continuous bit stream into multi-bit nibbles.

9. The system of claim 1, wherein the one or more samplers for continuous variables comprise one-bit oversampled delta sigma modulators.

10. The system of claim 1, wherein the continuous variables may be present at a rate of one per frame, multiple samples in a frame, or less than once per frame.

11. The system of claim 1, further comprising one or more filters, wherein the one or more filters convert the samples of continuous variables to lower sample rate, higher precision samples, which can provide either low-latency coarse measurements for protection functions or slower, high-precision samples for control.

12. The system of claim 11, wherein the one or more filters provide robustness to occasional bit errors as the one or more filters are all of equal weighting.

13. The system of claim 1, wherein at least one bit in each frame is used to construct a lower sample rate data stream communicating larger frames of slower data.

14. The system of claim 13, wherein the slower data comprises temperature or power supply voltages.

15. A method for controlling one or more power semiconductor devices, comprising:
passing a continuous bit stream at a constant frequency over a serial communication link between a controller and a power electronics module;
retrieving, from the continuous bit stream sets of bits that define frames and include framing information, wherein individual bits can be identified at each end of the serial communication link, wherein quantities of data to be communicated from a sending end to a receiving end of the serial communication link can be one of discrete binary values and samples of continuous variables;
sampling continuous variables from a plurality of sensors using one or more samplers, wherein the one or more samplers have a set sample bit width and a sample rate;
synchronizing the sample rate with a frame rate of the serial communication link at a rational frequency relationship, wherein the frame rate is based on the framing information; and
multiplexing and demultiplexing the quantities of data into and out of frames.

16. The method of claim 15, further comprising de-bouncing the discrete binary values, wherein de-bouncing of the discrete binary values provides robustness to occasional bit errors by requiring two or more consecutive state changes before declaring such, while still providing a low latency due to an overall high frame rate.

17. The method of claim 15, wherein depending on a direction of communications on the serial communication link, the quantities of data to be communicated from the sending end to the receiving end of the serial communication link is one of feedback variables and commanded variables.

18. The method claim 17, wherein the one of feedback variables and commanded variables comprise one or more of phase voltages, phase currents, DC link voltages, switch desaturation error states, power switch state command or enable/disable commands.

19. The method of claim 15, wherein the serial communication link is a 100 Mbit Ethernet physical layer.

20. The method of claim 19, wherein the Ethernet physical layer is galvanically isolated.

21. The method of claim 15, wherein at least one media independent interface (MII) PHY device is used in recovering the framing information from the continuous bit stream to define sets of bits.

22. The method of claim 21, wherein recovering framing information from the continuous bit stream to define sets of bits comprises the MII PHY initially framing the continuous bit stream into multi-bit nibbles.

23. The method of claim 15, wherein the one or more samplers for continuous variables comprise one-bit oversampled delta sigma modulators.

24. The method of claim 15, wherein the continuous variables may be present at a rate of one per frame, multiple samples in a frame, or less than once per frame.

25. The method of claim 15, further comprising filtering the samples of continuous variables using one or more filters, wherein the one or more filters convert the samples of continuous variables to lower sample rate, higher precision samples, which can provide either low-latency coarse measurements for protection functions or slower, high-precision samples for control.

26. The method of claim 25, wherein the one or more filters provide robustness to occasional bit errors as the one or more filters are all of equal weighting.

27. The method of claim 15, wherein at least one bit in each frame is used to construct a lower sample rate data stream communicating larger frames of slower data.

28. The method of claim 27, wherein the slower data comprises temperature or power supply voltages.

* * * * *